(12) United States Patent
King

(10) Patent No.: US 9,227,860 B1
(45) Date of Patent: Jan. 5, 2016

(54) DISPENSING SYSTEMS

(75) Inventor: Joseph A. King, Wayzata, MN (US)

(73) Assignee: KING TECHNOLOGY INC., Hopkins, MN (US)

( * ) Notice: Subject to any disclaimer, the term of this patent is extended or adjusted under 35 U.S.C. 154(b) by 1142 days.

(21) Appl. No.: 13/135,984

(22) Filed: Jul. 20, 2011

Related U.S. Application Data

(63) Continuation-in-part of application No. 11/540,882, filed on Sep. 29, 2006, now abandoned.

(60) Provisional application No. 60/724,126, filed on Oct. 6, 2005.

(51) Int. Cl.
| | |
|---|---|
| B01J 49/00 | (2006.01) |
| B01D 21/24 | (2006.01) |
| E03B 11/00 | (2006.01) |
| C02F 1/68 | (2006.01) |
| E04H 4/12 | (2006.01) |
| C02F 1/50 | (2006.01) |
| C02F 1/76 | (2006.01) |

(52) U.S. Cl.
CPC ............... *C02F 1/68* (2013.01); *E04H 4/1281* (2013.01); *C02F 1/50* (2013.01); *C02F 1/685* (2013.01); *C02F 1/76* (2013.01); *C02F 2209/44* (2013.01); *E04H 4/12* (2013.01)

(58) Field of Classification Search
None
See application file for complete search history.

(56) References Cited

U.S. PATENT DOCUMENTS

| | | | | |
|---|---|---|---|---|
| 3,963,375 A * | 6/1976 | Curtis | ............................ | 417/12 |
| 4,050,853 A * | 9/1977 | Pereyra | ................. | F04D 27/008 |
| | | | | 200/61.04 |
| 5,206,819 A * | 4/1993 | Illing | ............................ | 700/276 |
| 5,323,307 A * | 6/1994 | Wolf | ......................... | H02J 3/14 |
| | | | | 700/22 |
| 5,582,718 A * | 12/1996 | Sobczak | ........................ | 210/136 |
| 6,125,481 A * | 10/2000 | Sicilano | ............................ | 4/509 |
| 2001/0010296 A1* | 8/2001 | Hirota et al. | ................... | 210/175 |
| 2002/0040878 A1* | 4/2002 | Hammonds | ................... | 210/749 |
| 2004/0211731 A1* | 10/2004 | Ferguson et al. | ............... | 210/739 |
| 2005/0139530 A1* | 6/2005 | Heiss | ............................ | 210/85 |
| 2010/0147389 A1* | 6/2010 | Blanchard | ......................... | 137/1 |
| 2011/0049024 A1* | 3/2011 | Pank | ......................... | C02F 1/56 |
| | | | | 210/104 |
| 2013/0284647 A1* | 10/2013 | Briscoe | ................... | C02F 1/008 |
| | | | | 210/96.1 |

* cited by examiner

*Primary Examiner* — Nam Nguyen
*Assistant Examiner* — Richard Gurtowski
(74) *Attorney, Agent, or Firm* — Jacobson & Johnson

(57) ABSTRACT

A system for sensing and measuring water characteristics or an external factor and initiating controlling the water characteristics of the body of water which may be based on external factor where the controlling of the water characteristics can be achieved through dosing or nondosing of an inactive material through an active material or dosing both an active material and an inactive material in the body of water in response to measured levels of water characteristics to enable the water to be used for either internal or external use in controlling harmful organisms.

10 Claims, 8 Drawing Sheets

DISPENSING SYSTEMS

CROSS REFERENCE TO RELATED APPLICATIONS

This application is a continuation in part of U.S. application Ser. No. 11/540,882 titled Dispensing System field Sep. 29, 2006 now abandoned which claims priority from provisional patent application 60/724,126 filed Oct. 6, 2005.

FIELD OF THE INVENTION

This invention relates generally to controlling water characteristics and, more specifically, to measuring water characteristics and automatically maintaining the proper level of a water characteristic in a body of water if the water characteristics of the body of water are at unacceptable levels.

STATEMENT REGARDING FEDERALLY SPONSORED RESEARCH OR DEVELOPMENT

None

REFERENCE TO A MICROFICHE APPENDIX

None

REFERENCE TO A MICROFICHE APPENDIX

None

BACKGROUND OF THE INVENTION

The concept of maintaining proper water characteristics in water containers such as spas, swimming pools or the like by rendering harmful organisms ineffective is known in the art. Typically, chlorine or chlorine in combination with a source of metal ions has been used to purify pools, spas hot tubs and the like. In one type of dispensing system water is continually directed through an inline dispenser, which is located in an inline circulation line that circulates water back and forth from the body of water such as a swimming pool. The inline dispenser may contain a dispersant for affecting a water characteristic, an example of a dispersant for use in dispensers for pools is a mineral pack sold by King Technology of Hopkins Minn. The inline dispenser includes a selector valve that diverts a portion of the water in the inline circulation line through a source of chorine, which is in solid form. The solid chlorine slowly dissolves as it is continually dispersed into the circulation line and subsequently into the body of water as the water flows through the inline dispenser. In some cases minerals, such as silver, copper or zinc are also placed in a chamber in the inline dispenser so that the metal ions therefrom can be used to supplement the chlorine in ridding the water of harmful organisms. In these types of systems the selector valve on the inline dispersal valve is set to control the flow of water through a chamber containing the dispersants based on an average use of the pool or spa. An example of such a type of inline dispenser with a selector valve is shown and described in U.S. Pat. No. 6,210,566.

In other types of systems, such as dose systems, liquids, which directly affect the water characteristics of the body of water, may be dosed directly into the body of water. For example, to control the chlorine level of the body of water one may periodically dose a liquid solution of sodium hypochlorite directly into the body of water. Similarly, other water characteristics such as pH may also be controlled by the liquid dosing of a pH solution such as an acid solution or an alkaline solution directly into the body of water. In these types of dose system the active ingredient, which is dosed into the body of water, typically comprises a dispersant in liquid form.

While the source of chlorine used to control the level of chlorine in a body of water may be a solid or liquid in some systems the source of chorine maybe generated by an electrolytic cell, which can also be placed in an inline circulation line.

Thus, multiple ways exist to control or maintain an acceptable level of a halogen such as chlorine or bromine in a body of water, for example a pool, a hot tub or other contained bodies of water, which may be used for recreational or non-recreational purposes. In the inline method water is circulated through an inline dispenser that includes a selector valve for directing a portion of the water in an inline circulation system through an inline dispenser chamber, which contains chlorine in a solid form such as a puck or tablets. By adjusting the selector valve one can increase or decrease the flow of water through the inline dispenser chamber, which contains the chlorine. Controlling the flow of water through the inline dispenser chamber with the selector valve allows one to maintain the proper chlorine level in the body of water through a continual and gradual release of chlorine into the inline circulation system. If more or less chlorine is needed in the body of water the selector valve on the inline dispenser can be manually adjusted to increase or decrease the flow of water thereby increasing or decreasing the release rate of chlorine into the body of water. Such inline dispensing system have the advantage that the user does not have to come into direct contact with the dispersant. For example, solid chlorine in pucks or the tablets may be placed in cartridges or containers, which are placed in a chamber in the inline dispenser. Such inline dispensers may also be used in conjunction with a secondary dispersant such as a source of metal ions. The benefit of the use of metal ions as a supplement to the chlorine is that presence of metal ions allow one to use reduced levels of chlorine since the metal ions can also kill harmful organisms. Although such dispensing systems work well they are not responsive to changes in the level of a water-affecting characteristic in the body of water since the dispensing system is always on when the recirculation pump is in operation. In addition the selector valve on the inline dispenser requires manual adjustment if one wants to increase or decrease the level of dispersant in the pool by changing the chlorine delivery rate.

Another method of controlling the level of chlorine in a pool is the dose method. In the dose method one periodically doses an active ingredient such as a liquid solution of sodium hypochlorite or the like directly into the body of water when the level of chlorine falls below a minimum level. Oftentimes this method is used to shock a pool to rid the pool of accumulated bacteria or algae.

In some systems one measures the level of a water characteristic, for example, pH or chlorine in the body of water. A controller using the information can increase or decrease the level chlorine in the body of water by dosing a liquid solution of an active ingredient such as sodium hypochlorite directly into the body of water. Such types of active ingredient dosing systems, which dose a chlorine dosing solution, have the disadvantage that the user may accidentally be harmed by coming into direct contact with the chlorine dosing solution either during the preparation of the chlorine dosing solution or the delivery of the chlorine dosing solution. Nevertheless this type of dose system where one doses an active ingredient allows one to quickly increase the level of chlorine in response to the measured level of chlorine.

In inline dispensing system, such as in a pool system, the selector valve on an inline dispenser is manually set to maintain the proper level of chlorine in the pool based on the pool size and use. Such systems typically operate with no sensors since they rely on the manual adjustment of the flow through an inline dispenser, which contains water purification such as minerals and/or chlorine in solid form.

The present system eliminates disadvantages of the liquid dosing system and the inline dispensing systems while providing a system with benefits and advantages over such systems.

SUMMARY OF THE INVENTION

A system for measuring one or more water characteristics in a body of water or an external factor and adjusting the water characteristics in response to the measured water characteristics or initiating an adjustment of the water characteristic in response to measurement of an external factor before a change in the water characteristic is known. In one example of the invention a portion of the body of water, which is an inactive material, is dosed through a source of water purification material, which is an active material. In another embodiment an electrolytic cell generates metal ions in response to on-the-go measured levels of chlorine to maintain the chlorine in body of water at a level suitable for recreational use. In addition to dosing an inactive ingredient or liquid such as water into a dispersant or active ingredient one may also use the system to periodically dose both active ingredients or inactive ingredients into the body of water. Active ingredients such as water characteristic affecting materials, for example an acid solution or an alkaline solution may be dosed into the body of water to maintain the pH of the system within the proper comfort range. If a chlorine generator is used to generate an active ingredient one can measure the level of chlorine in the water and maintain the water suitable for use with an electrolytic cell that releases chlorine into the body of water in response to the measured level of chlorine. The system can also be used to sense the level of chlorine in the body of water and alert the operator to add chlorine to an inline dispenser where water is dosed through the active ingredient therein. The system can also be used to sense the concentration of other active ingredients or materials such as the concentration of salt in the body of water and then alert an operator to add salt to body of water or activate a hopper to dispense salt into the body of water. In addition the system can determine when to replenished a dispenser based on either historical information or based on actual delivery of dispersants and when the determination is made provide an alert signal that the dispenser needs replenishing.

DESCRIPTION OF THE PREFERRED EMBODIMENT

Figure 1:
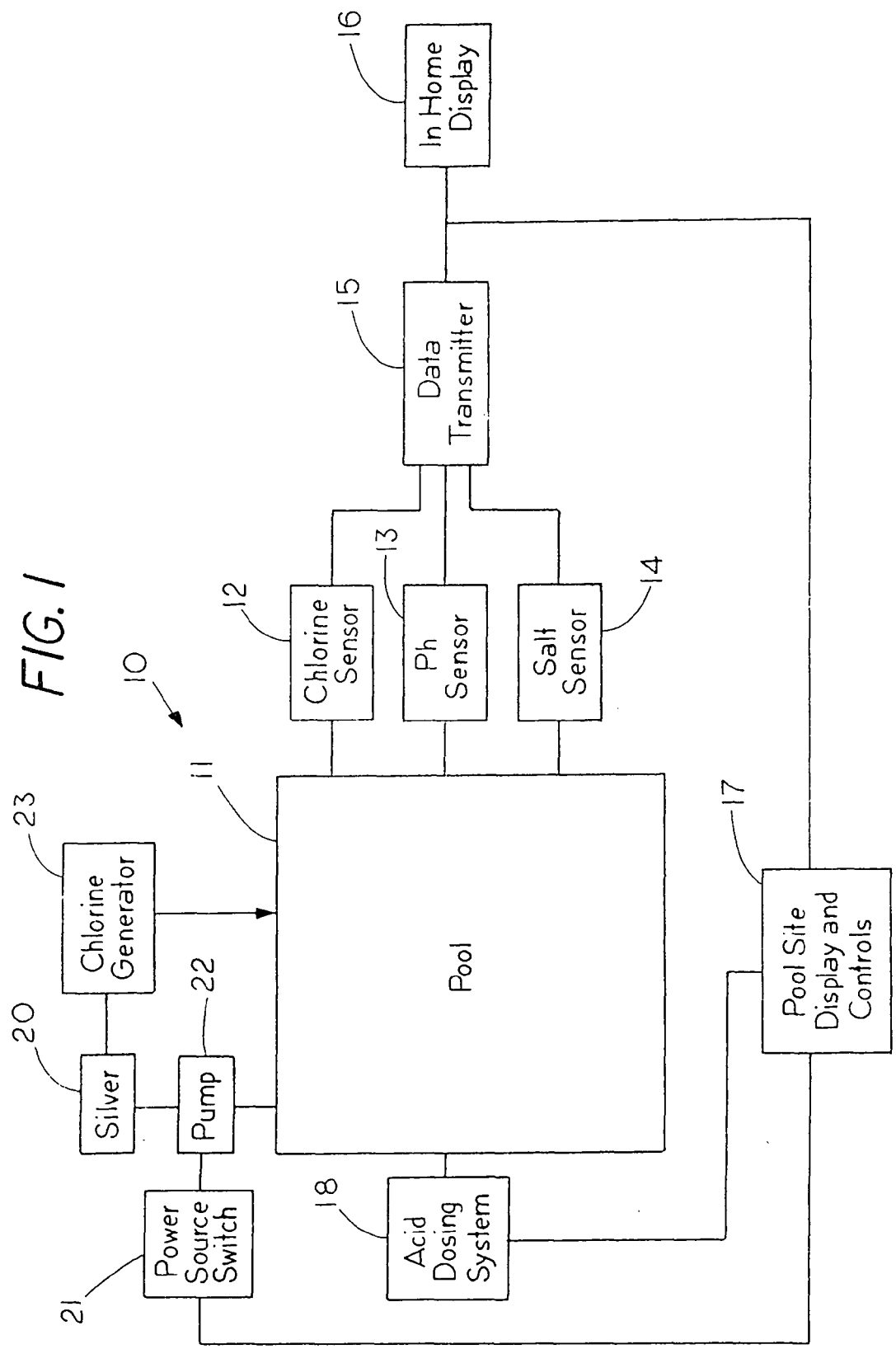
FIG. 1 is a block diagram of a system for water purification a body of water in a container.

In contrast to the methods that dose a liquid solution of an active ingredient such as sodium hypochlorite into a body of water the invention described herein senses the level of an active ingredient, such as chlorine, in the body of water and in response thereto doses an inactive liquid ingredient, such as water, into a chamber of a dispenser, which contains an active ingredient, such as chlorine in solid form. By using a sensor to measure a water characteristic and by dosing an inactive ingredient, i.e. water into an a dispenser such as an inline dispenser, which contains an active ingredient, one obtains a water dose system with enhanced safety benefits and performance advantages in the control of a water characteristic in a body of water. In other examples of the invention described herein where chlorine is used as the active ingredient the level of chlorine in the system may be controlled through the use of a chlorine generator, however, in either system one eliminates the need to handle a solution of an active chlorine-affecting ingredient such as sodium hypochlorite.

One example of the invention described herein uses an optical sensor to sample and measure water characteristics such as the level of chlorine in the body of water although other types of sensors may be used to measure water characteristics. The measurement obtained from the sensor may be used to control the dosing of an inactive liquid ingredient, such as water, into a solid active ingredient or the dosing of an active ingredient into a body of water. By active ingredient it is meant that an ingredient that directly affects the characteristics of the water, for example sodium hypochlorite is an active ingredient since when it is added to a body of water because it directly increases the level of chlorine in the body water. Other examples of active ingredients include pH dosing solutions such as acid solution or alkaline solutions, which also directly affect the pH of the water when they are added to the body of water. In contrast to active ingredients, which directly affect a characteristic of the water, it is understood that the inactive ingredient refers to materials that do not change the water characteristics of the water in the system when added to the body of water, for example with a pool it could be the pool water, since adding the same pool water to the pool would not change the water characteristics of the pool water.

To control the level of a water affecting characteristic such as chorine in a body of water, it has been found that dosing an inactive liquid ingredient such as water rather than the dosing an active ingredient such as a liquid solution of sodium hypochlorite into an inline dispenser, provides a water dose system that has the advantage of providing better control of the chlorine level than a conventional inline system using an inline dispenser which remains in an on condition or in a dispensing condition in an inline water circulation system as long as the water circulates through the water circulation line. The use of the water dose system, which doses water through active ingredients in response to a measurement of a water characteristic, also extends the life of the active ingredient such as chlorine when the chlorine is used in a conventional inline dispensers. A further benefit of the water dose system described herein is that it can alert the user when the active ingredient, such as the solid chlorine in the dispenser, may have to be replenished. An example of solid chorine, which is available in tablets or pucks is trichloro-s-triazinetrione, which is referred to as Trichlor. A further benefit of the water dose system for controlling the level of chlorine in the body of water is that the it eliminates the need to prepare hazardous dosing solution of liquid sodium hypochlorite, which eliminates or minimizes opportunities for a user injuring himself or herself by accidentally mishandling the sodium hypochlorite solution.

FIG. 1 shows a block diagram of a system 10 for purification of a body of water in a container such as a pool 11 wherein a number of water variables or water characteristics can be measured, controlled or monitored either at the pool site or at a remote location from the pool site with each of the variables or water characteristics independently controllable. The system 10 includes a set of three sensors for measuring multiple water characteristics in the pool 11 including a chlorine sensor 12 for measuring the level of chlorine in the water in the pool, a pH sensor 13 for measuring the pH of the water in the pool, and a salt sensor 14 for measuring the concentration of salt in the water in the pool. Each of the measurements is for a different purpose, for example the chlorine measurement is used for determine if their is an effective amount of chlorine present in the water. The pH sensor is used to determine if the pH of the water is such that the water is comfortable to the user and the salt sensor is used for measuring the concentration of salt in the water to ensure that the electrolytic cell can operate effectively.

In operation, the information on the measured levels from each of the sensors 12, 13 and 14 is fed into a data transmitter 15 such as a computer or the like that transmit the measured levels to an in-home display 16, which is remote from the pool, and to a pool operator station 17 thereby providing information on the condition of the water either at the pool site or at a remote location. A feature of the system of FIG. 1 is the water purification through the coaction of minerals and an electrolytic cell, and more specifically, a system capable of both static or on-the-go treatment of a body of water by measuring a plurality of water variables in the body of water and in response to the water purification needs thereof extracting a portion of the water from the body of water and flowing the extracted water through a bed of minerals in a dispenser and through an electrolytic cell such as a chlorine generator before returning the extracted water to the body of water with the amount of metal ions released controllable with the dispenser and the amount of chlorine generated determined by controlling the operation cycle of the chlorine generator.

Either or both of the display units 16 and 17 can also contain controls for adjusting the measured levels chlorine, pH or salt in the pool 11. For example, the controls in display unit 17 can be used to manually or automatically control an acid dosing system 18 that doses or pours acid into the system to adjust the pH of the water the pool. Suitable acid dosing systems are commercially available, an example of an acid dosing system is the acid dosing system sold by Stenner Pump Company of Jacksonville Fla. is Model SIG45MJL1A2STAA. Thus the pH of the system can be independently controlled to bring the pH of the system to the proper level.

The salt content of the water can be adjusted by adding salt directly to the pool if the salt sensor indicates the concentration of salt is low.

The operator station controls 17 can also be used to manually or automatically control the operation of a pump 22 through a power source switch (not shown) that can change the pump rate to prevent, decrease or increase circulation of water through a mineral dispenser 20 and an electrolytic cell 23 in order to control the level of metal ions and the level of chlorine in the system 10. In the embodiment shown silver ions are dispensed typically from a mineral such as shown and described in my U.S. Pat. No. 6,217,892, which is hereby incorporated by reference. Suitable commercially available electrolytic cells are generally available from American Swimming Pool Systems, LLC Altamonte Springs, Fla.

In operation of system 10 three variables, which are unrelated or independent of each other, such as the amount of chlorine in the water, the pH of the water and the concentration of salt in the water are measured and directed to a central control or operator station 17 where an operator can adjust the delivery of the necessary amount of the unrelated water variables through three different methods. That is, system 10 can extract water from the pool and direct the water through dispensers to automatically control the amount of water characteristic affecting material in the pool water or by manually adding water characteristic affecting material to pool water.

The chlorine sensor 12 can be mounted either directly in the pool water or can be intermittently injected into the water in order to extend the life of the chlorine sensor. Likewise the pH sensor 13 or the salt sensor 14 can be mounted directly in the pool. A suitable chlorine sensor such as Chemtrol 265 free chlorine/pH sensor sold by Chemtrol of Santa Barbara Calif. can be used to measure the chlorine or can be used to measure the pH or both.

Another sensor suitable for automatic chemical monitoring and balancing water characteristics including chlorine is referred to as Prizma and is sold by Blue I Water Technologies. The Prizma device includes automatic chemical monitoring and balancing for pools and spas. In a system using the Prizma device the water is sampled and analyzed by a controller in the Prizma device. The Prizma device includes a number of sensors including a sensor to measure the chlorine level and a sensor to measure the pH of the water. If a measured water characteristic is below a preselected level the Prizma sensor controller 201 sends a go signal such as dose signal to a source of an active ingredient. For example, if the pH of the system is below a preselected level the Prizma device sends a go signal to dose acid into the body of water. On the other hand if the pH of the system is above a preselected level the system sends a signal to dose alkaline into the body of water. The Prizma device is suitable for optically measuring a water characteristic parameter and generating either a go or no go signal in response to a measured level of a water affecting characteristic and is shown in U.S. patent publication 2008/019331 which is hereby incorporated by reference.

Figure 2:
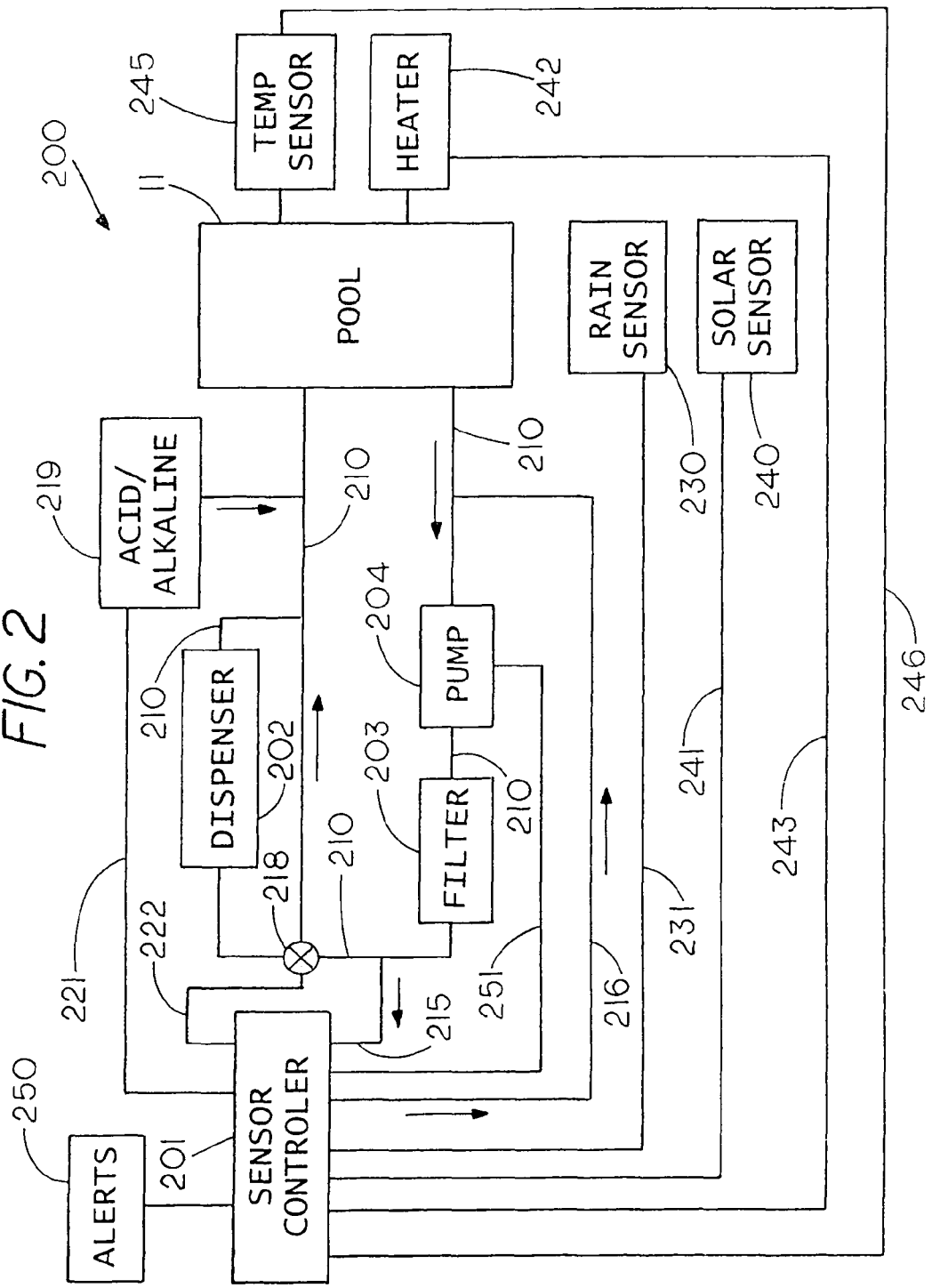
FIG. 2 is a block diagram of a water dose system for water purification a body of water in a container.

FIG. 2 shows a block diagram of a water dose system 200 for water purification of a body of water in a container such as a swimming pool 11. Pool 11 contains water to be purified wherein one or a plurality of water characteristics can be simultaneously or independently measured, controlled or monitored either at the pool site or at a remote location from the pool site with each of the water characteristics independently controllable.

The water dose system 200 includes a pump 204 that circulates water to and from swimming pool 11 via a pipeline 210 and a parallel pipeline 210a, which contains an inline dispenser 202. Pipeline 210 includes a filter 203 for removing unwanted particles from the water. In the example of FIG. 2 the inline dispenser 202, which holds a solid dispersant, is located in a parallel pipeline 210a with a three way valve 218 located at the junction of pipeline 210 and pipeline 210a.

Figure 5:
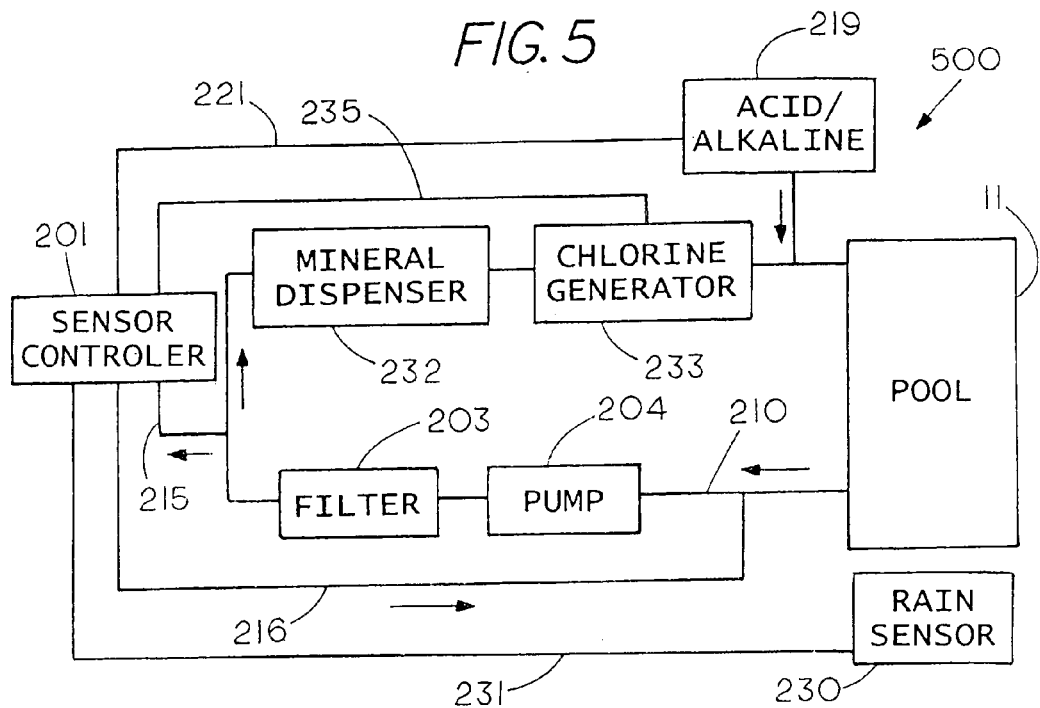
FIG. 5 is a block diagram of a water dose system for water purification a body of water in a container.
Figure 5A:
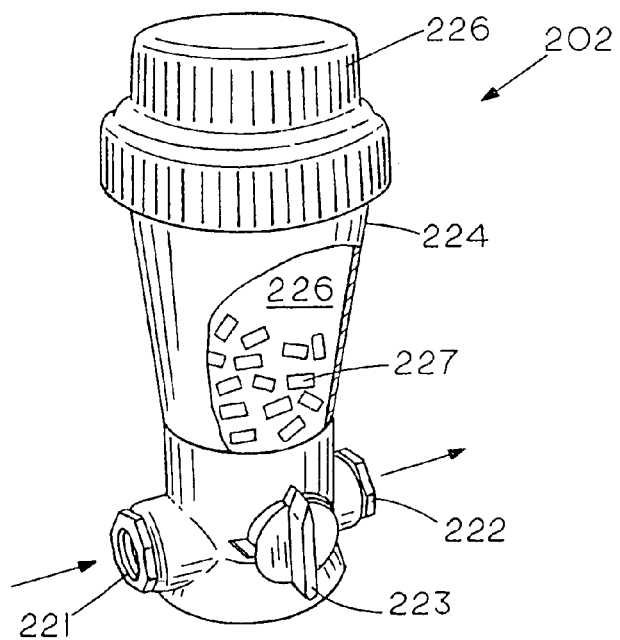
FIG. 5A a partial sectional view of a dispenser holding a halogen in solid form.

FIG. 5A shows an example of a typical inline dispenser 202 comprising a housing 224 having an inlet 221 and outlet 222 for inline connection to pipeline 210a. Dispenser 202 includes a chamber 226 having a batch of solid active materials 227 such as chlorine in puck or tablet form. A water selector valve 223 in inline dispenser allows one to direct more or less water through the chamber 226, which contains the solid chlorine tablets without changing the flow rate of water through the inline dispenser. Other examples of inline dispenser valves are shown in my U.S. Pat. Nos. 5,076,315; 6,210,566 and 7,604,018, which are hereby incorporated by reference. Although the inline dispensers are shown with an integral selector valve for controlling the flow through the dispensing chamber it is envisioned that in the present invention one may elect not to use an inline dispenser with a selector valve in conjunction with the dosing system described herein without departing from the spirit and scope of the invention. Thus offline dispensers or dispensers that are located in the body of water may be used with the invention described herein. Likewise while the active ingredient, which is dosed with water, is a solid that release chlorine other non-liquid active ingredients may be dosed with water without departing from the sprit and scope of the invention.

A further feature of the use of an inline dispenser 220 having a water selector valve 223 therein is that the while the water dosing mode in the dispenser can be selected to be on, off or in a partial dose mode the selector valve 223 in the inline dispenser functions to limit the amount of dose water that flows through the batch of solid chlorine 227 in the inline dispenser housing 224 in response to the signal from the sensor thus providing further ability to control the level of chlorine to the body of water.

FIG. 2 shows a diverter valve comprising a three-way valve 218 located at the junction of pipeline 210 and pipeline 210a. Valve 218 enables one to direct water from pipeline 210 back to the pool 11 through an inline water circulation system including either pipeline 210 or parallel pipeline 210a or simultaneously through both pipelines 210 and 210a. If valve 218 is positioned to direct water through pipeline 210a one doses water through a batch of solid chlorine puck or tablets located in dispenser 202. On the other hand with valve 218 positioned to direct the water through pipeline 210 it prevents the dosing of water through the inline dispenser 202. Valve 218 may also be positioned to simultaneously direct water through pipelines 210 and 210a but in response to a signal from the sensor alter the amount of water directed through pipelines 210 and 210a thus changing the water dosing rate through the inline dispenser 202. Thus, in the example of FIG. 2, one has the option of dosing water through inline dispenser 202, not dosing water through the inline dispenser 202 or changing the dosing rate through the inline dispenser 202 in response to the signal from the sensor. Thus one can use selector valve 223 in inline dispenser 202 for manually controlling the flow of water through the chamber 226 when water flows through the 210 inline water circulation system to normally maintain a fixed chlorine delivery rate to the body of water. By using a diverter valve 218 located upstream of the inline dispenser 202 with diverter valve 218 responsive to the no dose signal or the dose signal from sensor controller 201 one can change the fixed chlorine delivery rate by periodically reducing the water dosed through the inline dispenser 202 to thereby maintain the chlorine level in the body of water within a prescribed range. Typically, the prescribed chlorine range is set based on the amount chlorine necessary to rid the body of water of harmful organisms. While chlorine has been described it is understood that the invention may be used with other halogens or nonhalogen water purification materials to maintain the water suitable for recreational use such as in pools or spas.

Sensor controller 201, which includes a controller for analyzing and generating a go or no go signal i.e. a dose signal or a no dose signal, samples the water from pipeline 210 through a branch pipe line 215 that delivers the water to the sensor controller 201 for measuring water characteristics such as the chlorine level of the water and the pH of the water. Sensor controller 201 includes means 215 for sampling water from the inline water circulation system and means for optically measuring a water characteristic of the sampled water where the measured water characteristic comprises a chlorine level with the sensor including a controller for determining if the sampled water is below a set point range and the controller generating a dose signal if the chlorine level is below a set point range and a no dose signal when the chlorine level is above the set point range.

After the measurement the water is returned to the inline circulation line via pipeline 216. If the sensor controller 201 determines the measured water characteristics such as the pH of the water is low the controller in sensor controller 201 sends a signal to acid/alkaline doser 219 to dose alkaline into the pipeline 210 and conversely if the pH is high the sensor in sensor controller 201 sends a signal to acid/alkaline doer 219 to dose acid into the system. If the sensor controller 201 determines the level of chlorine is below a preselected level the controller in sensor controller 201 sends a signal to the water dose system to dose water through a source of solid chlorine, which is located in dispenser 202. In the example shown the controller in sensor controller 201 controls the opening and closing of an electrically activatable three way valve 218. Controlling the valve 218 allows one to dose more or less water from the inline circulation line 210 through the solid dispersant such as chlorine or the like, which is located in a dispensing chamber in dispenser 202. By opening or closing valve 218 one provides a water dose system that can be used to control the level of chlorine in the water by periodically dosing an inactive ingredient such as water rather than dosing an active ingredient such as a solution of sodium hypochlorite.

In the system 200 a controller in sensor controller 201 measures and controls the opening and closing of the three way valve 218 and in addition the selector valve in the dispenser 202 may be manually set to control the amount of water that is dosed through the solid chlorine in the dispenser 202. As pointed out above system 200 one can also dose active ingredients such as acid or alkaline into the pipeline 210. Thus system 200 is not only a system that doses inactive ingredients but also a system that can dose either active ingredients or inactive ingredients into the body of water in response to measured values of water characteristics.

In the operation of system 200 the measured water characteristics are typically performed at preset time intervals by a sensor in sensor controller 201. While it would be ideal to continually measure the water characteristics other factors may make it impractical to continually monitor the water characteristics. Consequently, the sensor in sensor controller 201 may measure the water characteristics at four or eight hour intervals. In the case of outside bodies of water, which are subject to rain that can affect the water characteristics, one may want to measure the water characteristics more frequently in order to more quickly initiate the process of bringing the water characteristics into the normal range. In order to change the time intervals between measurements the system 200 includes a rain sensor 230, which is located proximate the body of water. When the rain sensor 230 detects rain a signal is sent to sensor controller 201 through line 231 to decrease the time between measurements of the water characteristics. For example, if the measurement of the water characteristics are taken at 8-hour intervals the rain sensor may direct the sensor controller 201 to make hourly measurements until the changes to the water characteristics of the body of water are corrected. Consequently, the process of bringing the water characteristics of the body of water into the proper ranges can begun more quickly and brought into compliance more quickly through use of a rain sensor 230 since the actual changes in the water characteristics are detected more quickly. In other cases one may want to use a measurement of an external factor such as a signal from a rain sensor or a signal from a solar sensor to initiate a corrective action before the system determines that there has been an actual change to a water characteristic. Through association of historical information on the relationship of external factors to water characteristics, such as pH or chlorine content, one may use the monitoring of the external factors to initiate corrective action to the water characteristics before an actual deviation of the water characteristic has been confirmed by the water characteristic sensors in the system. This feature is useful in those systems where the water characteristics may be monitored at intervals but the external factors are monitored continually or more frequently than the water characteristics are monitored.

Figure 3:
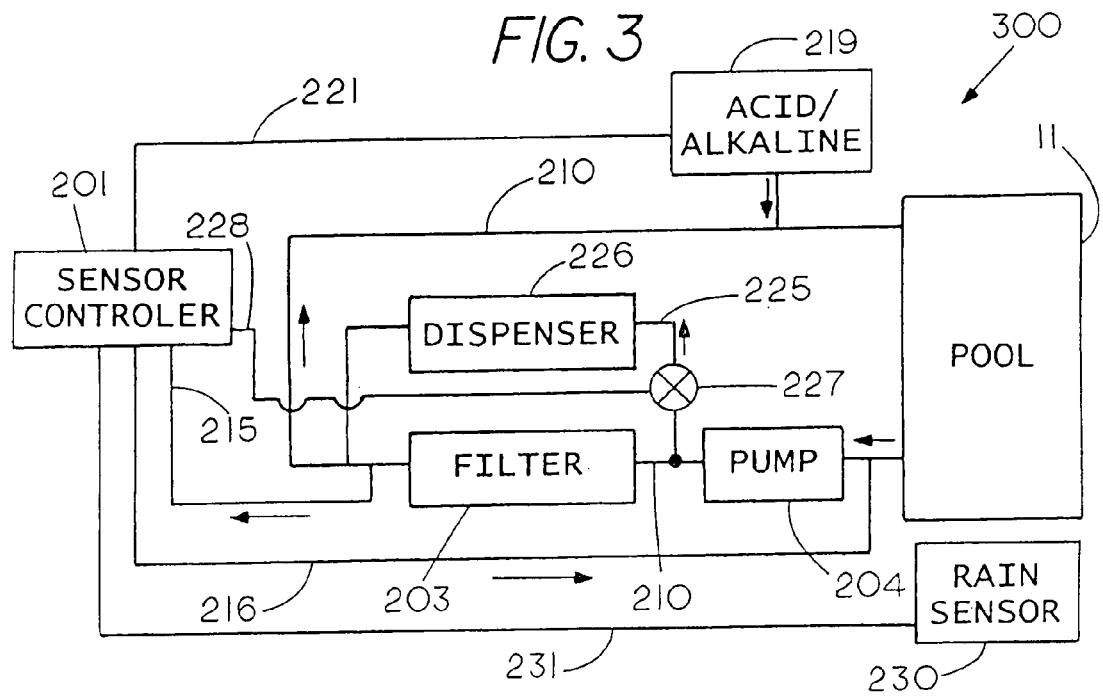
FIG. 3 is a block diagram of a water dose system for water purification a body of water in a container.

FIG. 3 shows a block diagram of an example of another dosing system 300 for water purification of a body of water in a container such as a swimming pool 11 wherein a number of water characteristics can be independently or simultaneously measured, controlled or monitored either at the pool site or at a remote location from the pool site with each of the variables or water characteristics independently controllable. A pump 204 circulates water to and from swimming pool 11 via a pipeline 210 that includes a filter 203 for removing unwanted particles from the water. A parallel branch pipeline 225 directs water from the pipeline 210 to an inline dispenser 226, which contains a solid dispersant such as chlorine in solid form. That is, dispenser 225 may contain a batch of an active ingredient such as chlorine tablets or pucks, and or minerals. In the example of FIG. 3 an electrical operated valve 227 such as a solenoid valve is opened or closed in response to a controller located in sensor 201. The opening of valve 227 permits water from the circulation line 210 to be dosed through the dispenser 226 while the closing of valve 227 prevents water from being dosed through the dispenser 226.

In operation of system 300 the sensor 201, which includes a controller, samples the water from pipeline 210 through a branch pipe line 215 which delivers the water to the sensor controller 201 for measuring a water characteristic such as the chlorine level of the water and/or the pH of the water. After the measurement the water is returned to the inline circulation line via pipeline 216. If the sensor controller 201 determines the water characteristics such as the pH of the water is low the controller in sensor controller 201 sends a signal to acid/alkaline doser 219 to dose alkaline into the pipeline 210 or conversely if the pH is to high sensor in sensor controller 201 sends a signal to dose acid. If the sensor in sensor controller 201 determines the level of chlorine is below a preselected level the controller in sensor controller 201 sends a signal to dose water through a source of solid chlorine located in dispenser 202. In the example shown the controller in sensor controller 201 opens valve 218, which doses water into dispenser 226. As dispenser 226 contains chlorine in solid form the dosing of water releases chorine into the circulation line 210. The water dosing continues until the chlorine level reaches a preselected level at which time the sensor may be programmed to send a signal to terminate the water dosing.

Dispenser 226 may be an inline dispenser with or without a selector valve therein. Dosing the flow of water through an inline dispenser 226 through a solenoid valve 227, which can be maintained in an open condition, a closed condition or a partially open condition allows one to dose more or less water from the inline circulation line 210 through the active ingredient in the dispenser 226. The water dosing though dispenser 226 can be continued until the level of chlorine in the water reaches a preselected level. The preselected level of chlorine will depend on whether or not supplemental biocides are used with the chlorine. For example if the dispenser 226 includes minerals as well as chlorine the level of chlorine in the pool can be maintained at a lower level than if the dispenser 226 only contained chlorine since the presence of minerals such as silver, copper and zinc are water purification materials that also kill harmful organisms. In the water dose system 300 the flow of water through the inline circulation pipeline 210 continues even though the water being dosed though dispenser 226 can be interrupted by the opening or closing of valve 227. The inline dispenser 226 may includes a selector valve, such as valve 223, for manually controlling the flow of water through a chamber in the inline dispenser as water flows through the inline water circulation system 210 to normally maintain a fixed chlorine delivery rate to the body of water. With the diverter valve, such as a solenoid valve, located upstream of the inline dispenser 226 and the diverter valve 227 responsive to the no dose signal or the dose signal one can change the fixed chlorine delivery rate by periodically reducing the water dosed through the inline dispenser 226 to thereby maintain the chlorine level in the body of water within the prescribed range.

System 300 also permits one to dose active ingredients into the body of water through an acid/alkaline doser 219. Although an acid doser and alkaline doser have been described other types of active ingredients may be dosed with the present system to thereby provide a system that doses both active and inactive ingredients to control the water characteristics in the body of water. System 300 may also use a rain sensor 230 that sends a signal to sensor controller 201 through line 231 to decrease the time interval between measurements of the water characteristics in the body of water.

Figure 4:
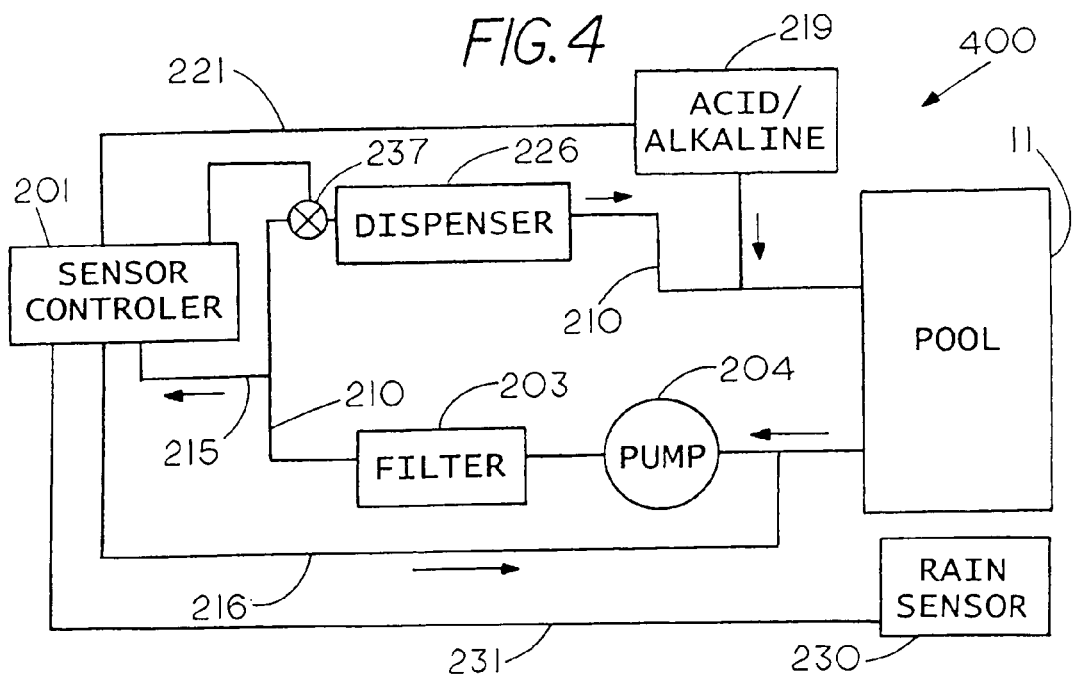
FIG. 4 is a block diagram of a water dose system for water purification a body of water in a container.

FIG. 4 shows a block diagram of an example of another system 400 for water purification of a body of water in a container such as a swimming pool 11 that contains water to be purified wherein a number of water characteristics can be simultaneously measured, controlled or monitored either at the pool site or at a remote location from the pool site with each of the variables or water characteristics independently controllable. A pump 204 circulates water to and from swimming pool 11 via a pipeline 210 that includes a filter 203 for removing unwanted particles from and an inline dispenser 226 holding a solid dispersant. An electrical activatable actuator 237, which controls a selector valve on the inline dispenser, can be used to dose more or less water from the circulation line 210 through the active ingredient in the dispenser 232 by adjusting the amount of water that can be separated from the main stream through the dispenser, which is then dosed through a chamber in the dispenser 226, without changing the amount of water that flows through the inline dispenser 232. The sensor 201, which includes a controller, samples the water from pipeline 210 through a branch pipeline 215 that delivers the water to the sensor controller 201 for measuring a water characteristic such as the chlorine level of the water and the pH of the water. After the measurement the water is returned to the inline circulation line via pipeline 216. If the sensor controller 201 determines the water characteristics such as the pH of the water is low the controller in sensor controller 201 sends a signal to acid/alkaline doser 219 to dose alkaline into the pipeline 210. Conversely, if the pH is high sensor controller 201 sends a signal to acid/alkaline doer 219 to dose acid into the system. If the sensor controller 201 determines the level of chlorine is below a preselected level the controller in sensor controller 201 sends a signal to dose additional water through a source of solid chlorine located in dispenser 226. In the example shown the controller in sensor controller 201 controls the amount of water that is dosed through dispenser 226 through control of the actuator 237. As dispenser 226 contains chlorine in solid form the dosing of water releases chorine into the circulation line 210. The water dosing continues until the chlorine level reaches a preselected level at which time the valve may 237 can be returned to its normal position. Controlling the flow of pool water though dispenser 226 allows one to dose more or less water from the inline circulating line 210 through the solid chlorine located in a chamber in the dispenser 202. The water dosing continues until the level of chlorine in the water reaches a preselected level. In the wafer dose system 400 water is allowed to continually flow circulation pipeline 210 with the amount of water dosed into the solid chlorine changed in response to a measurement of a water characteristic. Thus the method includes dosing the water into a source of chlorine by adjusting a selector valve 223 on the inline dispenser 202 to increase or decrease the flow of water through a dispensing chamber 226 in the inline dispenser while maintaining the same flow through the inline dispenser inlet 221 and outlet 222. The dosing method lacks the continuous material dispensing that one obtains with the use of only an inline dispenser since doses occur over limited time periods.

Thus with an electrically controllable selector valve 237 on inline dispenser 226 one can use the output signal from sensor controller 201 to open selector valve 237 to dose more water through the halogen in the chamber of the inline dispenser 226 to thereby increase a halogen delivery rate to the body of water or correspondingly dose less water through the inline dispenser 226 to thereby reduce the halogen delivery rate without changing the flow of water through the inline dispenser.

System 400 may also use a rain sensor 230 that sends a signal to sensor controller 201 through line 231 to decrease the time interval between measurements of the water characteristics in the body of water.

FIG. 5 shows a block diagram of an example of another system 500 for water purification of a body of water in a container such as a swimming pool 11 that contains water to be purified wherein a number of water characteristics can be simultaneously measured, controlled or monitored either at the pool site or at a remote location from the pool site with each of the variables independently controllable. A pump 204 circulates water to and from swimming pool 11 via a pipeline 210 that includes a filter 203 for removing unwanted particles from the water. The water is directed through an inline mineral dispenser 232 and through a chlorine generator 233. The sensor 201, which includes a controller, samples the water from pipeline 210 through a branch pipeline 215 that delivers the water to the sensor controller 201 for measuring a water characteristic such as the chlorine level of the water and the pH of the water. After the measurement the water is returned to the inline circulation line via pipeline 216. If the sensor controller 201 determines the water characteristics such as the pH of the water is low the controller in sensor controller 201 sends a signal to acid/alkaline doser 219 to dose alkaline into the pipeline 210. Conversely, if the pH is high sensor controller 201 sends a signal to acid/alkaline doser 219 to dose acid into the system. In this example water is being continually dosed through a batch of minerals in mineral dispenser 232. The mineral dispenser may be a stand-alone dispenser or part of inline dispenser. If the sensor controller 201 determines the level of chlorine is below a preselected level the controller in sensor controller 201 sends a signal to activate chlorine generator 233. In the example shown the controller in sensor controller 201 opens or closes a switch to activate the chlorine generator 233. The chlorine generator is activated until the chlorine level reaches a preselected level. Controlling the operation of the chlorine generator allows one to control the level of chlorine in the body of water. In this example the minerals are dosed with water and chlorine is generated insitu in the water until the chlorine reaches a preselected level.

System 500 may also use a rain sensor 230 that sends a signal to sensor controller 201 through line 231 to decrease the time interval between measurements of the water characteristics in the body of water.

The above examples of systems where it is important that the water characteristics can be measured and control have been described to include water immersions systems such as pools, spas and the like. On the other hand there are other bodies of water where the body of water is used for internal consumption. Water consumption systems and particularly animal watering systems can also benefit from the present invention. For example, it is known that if agricultural farm animals (e.g. cows, goats, chickens, turkeys etc.), which are often located in areas remote from a central purified water supply, receive water from local wells, which may contain harmful microorganisms. Also since the body of water is in open containers where multiple animals drink it is known that harmful organisms can quickly grow in the body of water. Consequently, agricultural animals may often ingest water with a high content of harmful microorganisms, which can cause stress on the animal as well as making it more difficult and costly to maintain the animal. The invention described herein is well suited for controlling harmful microorganisms in either a body of water which is consumed by the animals or a body of recreation water which persons immerse themselves.

While the invention describes the treatment of a body of water for immersion by humans or for consumption by animals a further benefit if the invention is the use of water from the body of water for preparation of food for human consumption. That is, the body of water that has been treated can be used to wash produce such as vegetables, fruits or the like to rid the produce of harmful organisms. Another potential residual benefit may occur with use of produce wash water from the body of water that has been subject to treatment with a source of metal ions such as silver ions is that a small residue of the silver ions from the produce wash water may be retained on the produce after the washing is completed. Such residue has the potential to provide extended control of microorganisms on the produce since the metal ions in low doses are not harmful to humans but can still destroy harmful organisms that come into contact with the metal ions.

In the operation of the system shown in FIG. 1 the monitoring of the salt content of the system is measured to ensure that there is sufficient electrical conductivity for the chlorine generator. While salt could be dosed, generally, the salt remains in the system and does not be have to be replenished periodically. Thus, in one embodiment the system for water purification can comprise a container 11 having a body of salt water therein; a sensor 12 for measuring a water variable; a mineral dispenser 94, in fluid communication with the container to receive the salt water, the mineral dispenser including a mineral 92 for releasing metal ions into the salt water; an electrolytic cell 91 in fluid communication with the container 11 for receiving the salt water from the container, the electrolytic cell 91 generating chlorine for delivery to the body of salt water; a pump 22 for circulating the salt water through the mineral dispenser and the electrolytic cell to generate at least two water purification materials; and an operator station 17 for receiving water variable information and for controlling the operation of the system either on-the-go or in a static condition.

Figure 6:
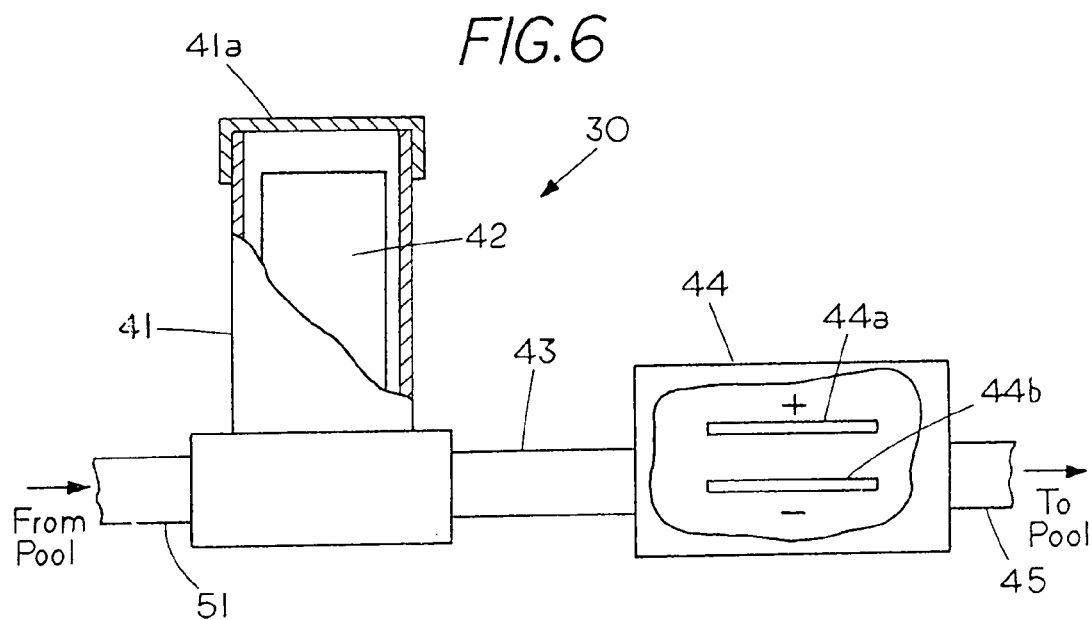
FIG. 6 shows dispensers for dispensing minerals and chlorine.

FIG. 6 shows a conventional delivery system 30 for delivering metal ions and chlorine in a body of water with the system 30 including a mineral dispenser 41 having a removable cover 41a and a cartridge 42 for holding minerals including silver chloride for dispensing metal ions into a pipeline 43 that directs the fluid through an electrolytic cell 44 shown partially in section with plates 44a and 44b for releasing the chlorine into the water wherein the chlorine is carried to the pool via pipe line 45. In this embodiment the cartridge 42 can be replaced when the minerals therein are depleted.

Figure 6A:
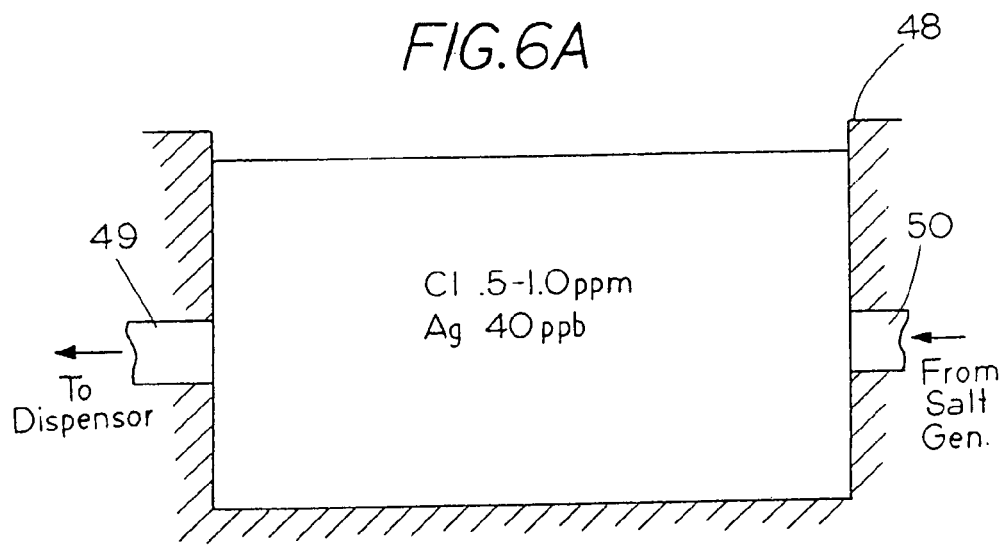
FIG. 6A is a cross sectional view of a pool having an inlet and an outlet.

FIG. 6A shows a pool having an inlet 50 for receiving water that has been purified and an outlet 49 for directing water into the inlet 51 of the dispenser 41 shown in FIG. 6. In the embodiment shown the minerals, which are of the type shown and described in U.S. Pat. No. 6,551,609 when used in conjunction with an electrolytic cell can generate chlorine levels in the range of 0.5 to 1.0 ppm and silver in amount of about 40 ppb.

Figure 7:
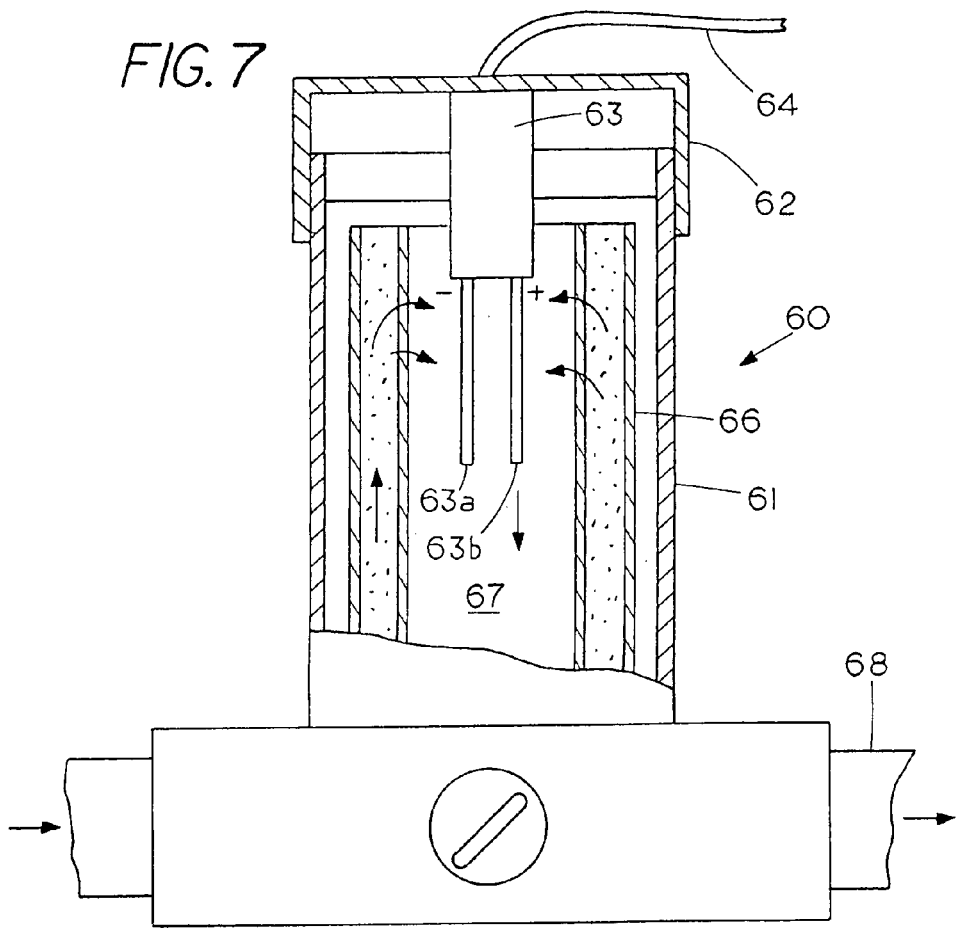
FIG. 7 is a container holding a mineral dispenser and an electrolytic cell.

FIG. 7 shows a combination mineral dispenser and electrolytic cell 60 including a dispenser housing 61 having a removable cover 62 with an electrolytic cell 63 with an electrode 63a and an electrode 63b. Electrolytic cell 63 connects to an external power source through electrical cord 64. Located in dispenser housing 61 is an annular shaped water porous cartridge 66 carrying the minerals with water flowable upward through the minerals and into a central chamber 67 to thereby contact the electrodes 63a and 63b. The water then flows out of housing 61 through outlet 68. In this embodiment the chlorine and the metal ions are generated in the same chamber with the electrolytic cell mounted on the removable cover so that the electrolytic cell can be centrally positioned in the dispenser housing to permit water to flow through the minerals and then through the electrolytic cell. In this embodiment either the annular mineral cartridge 66 or the electrolytic cell 63, which is mounted to the cap 62, can be replaced independent of each other even though both are contained in the same dispenser.

Figure 8:
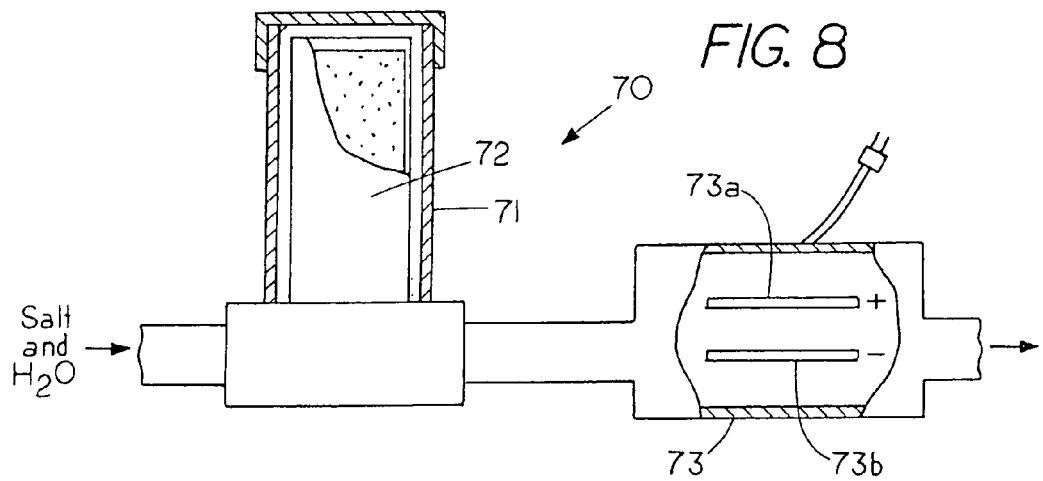
FIG. 8 is a container with a mineral dispenser located in line with a salt cell.

FIG. 8 shows an after market dispensing system that can be spliced into an existing pipeline of a water system with the system 70 including a dispenser housing 71 having a cartridge 71 with minerals therein that dissolves metal ions such as silver ions into the water where the water with the metal ions enters into electrolytic cell 73 where the plates 73a 73b release the chlorine from the salt to enable the combination of chlorine and silver ions to control the level of bacteria in the body of water. In the embodiment shown pipe 75 can be sliced into an existing pipeline as can pipe 76 to permit circulation of water through the dispenser housing 71 and the electrolytic cell 73. Once spliced in the operator station of FIGS. 1-5 can control the dispenser.

Figure 9:
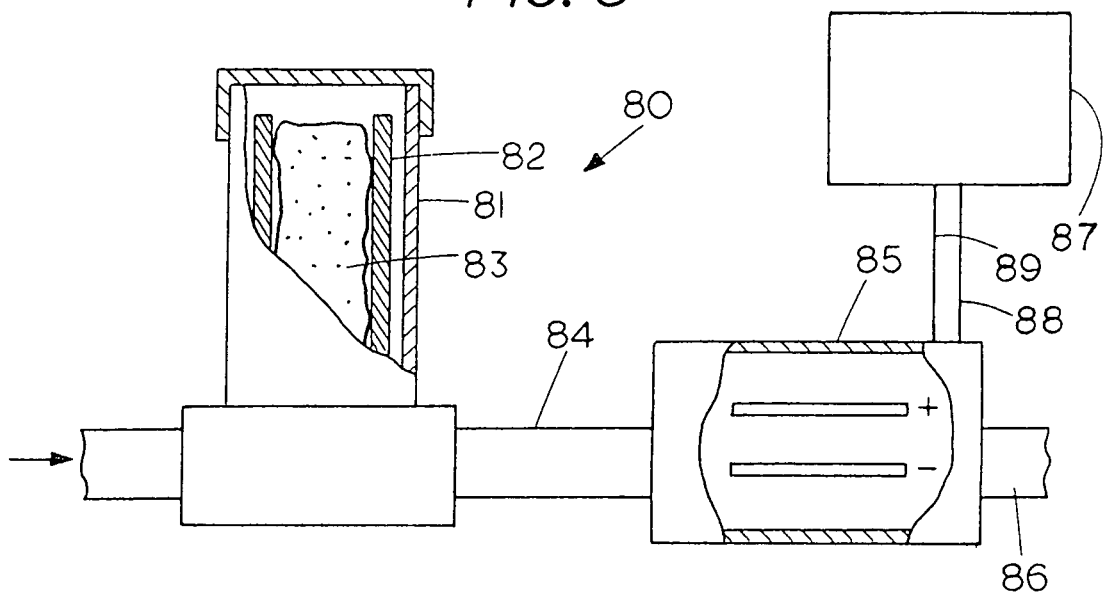
FIG. 9 shows a container holding minerals and salt with an electrolytic cell located downstream of the container.

FIG. 9 shows an alternate embodiment of a system 80 wherein the dispenser housing 81 includes a cartridge 82 containing minerals and a supply of salt 83 with the dispenser directing water through the carriage 81 and the salt 83 to increase the concentration of salt in the water to a proper level. The water containing the salt flows through the electrolytic cell 85 to release the chlorine into the pipeline 86 wherein both the metal ions and the chlorine are carried into the body of water to kill bacteria therein. In this embodiment the electrolytic cell 85 is powered by a solar cell 87 that supplies power to the salt generator 85 through electrical leads 88 and 89.

Figure 10:
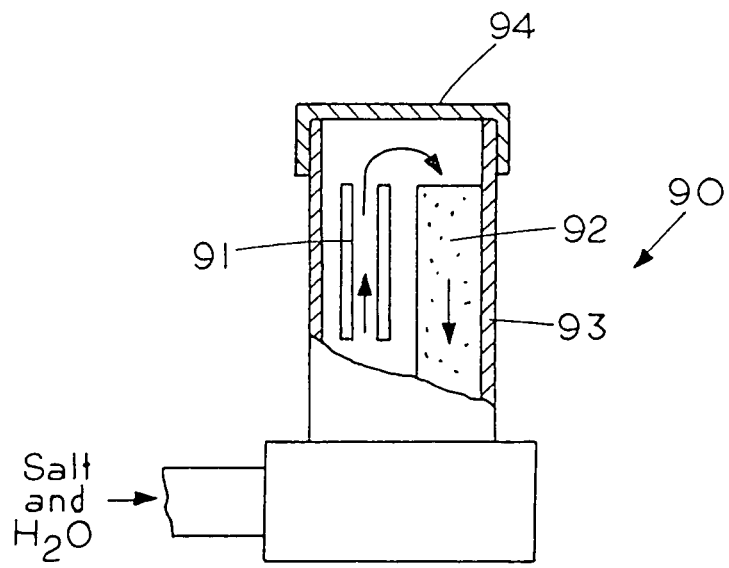
FIG. 10 shows an electrolytic cell and minerals located in the same dispenser housing.

FIG. 10 shows an alternate embodiment of a system 90 wherein the electrolytic cell 91 and the minerals 92 are located in a side-by-side condition in dispenser housing 93 with a cover 94 thereon to allow for independent replacement of either minerals 92 or electrolytic cell 91. In this embodiment a single dispenser housing can be used for delivery of both metal ions and chlorine for controlling the bacteria in the system.

Figure 11:
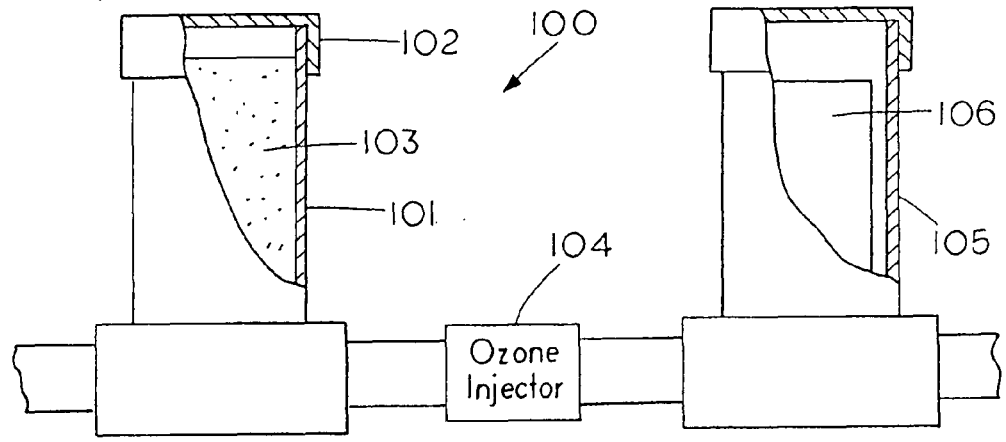
FIG. 11 shows a system for injecting ozone into the water.

FIG. 11 shows a system 100 including an inline dispenser 101, with a cover 102, that contains salt 103 therein. As water flow through the dispenser 101 it dissolves the salt to increase the concentration of salt in the water. The water with the salt therein flows into a further inline dispenser housing 105 containing minerals 106 that dispense metal ions into the water. The water then flows through an Ozone injector 104. In this embodiment the salt in the water is converted into hypochlorous acid (HOCL) to kill bacteria in the water. In addition the water flows through the minerals, which releases metal ions to further control the bacteria level in the water.

Figure 12:
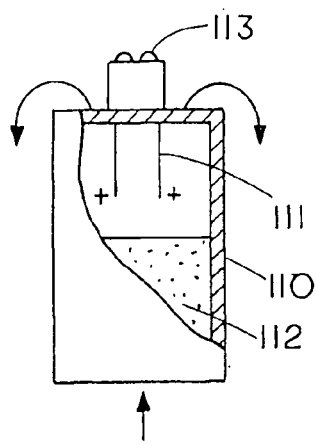
FIG. 12 shows a cartridge wherein the minerals and the electrolytic cell can be balanced so that both will expire at the same time.

FIG. 12 shows a replaceable cartridge 110 for use in a dispenser housing with the replaceable cartridge containing an electrolytic cell 11 and a supply of minerals 112. In operation the cartridge 111 is placed in a dispenser housing such as shown in my U.S. Pat. No. 5,218,893 and the contacts 113 extended to a source of power to power the electrolytic cell 111. In this embodiment the electrolytic cell 111 and the minerals can be balanced so as to be consumed in approximately the same amount of time thus allowing a user to replace a single cartridge that generates both metal ions and chlorine to maintain the body of water in a bacteria free condition.

Figure 13:
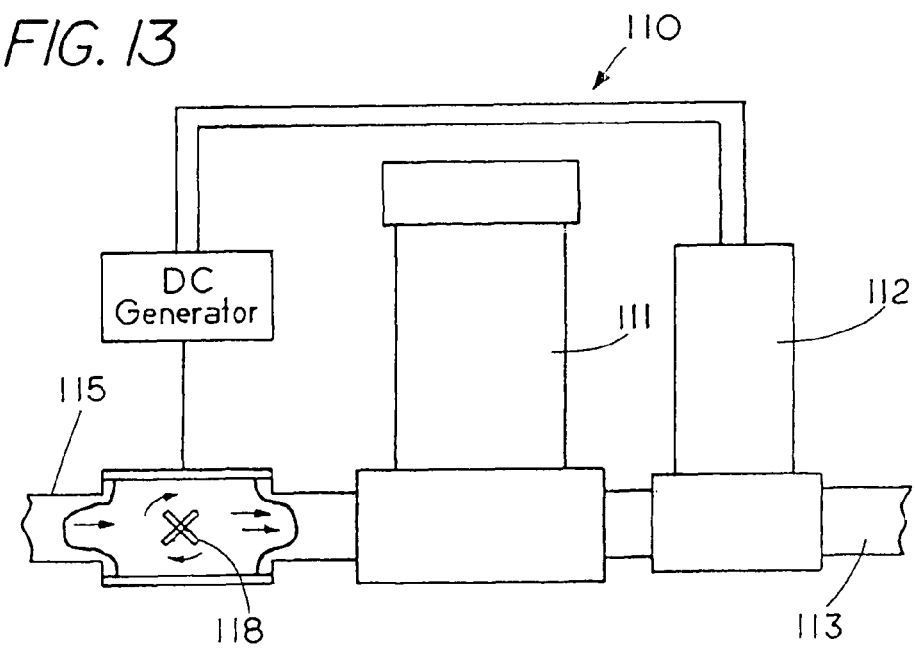
FIG. 13 shows a system wherein the energy to power the electrolytic cell is derived from the water flowing through the pipe.

FIG. 13 shows a system 110 wherein a portion of the energy of the circulating water is converted into electrical energy and includes a mineral dispenser 111 and an electrolytic cell 112. The system includes a water inlet 115 for receiving a stream of water from a pump and an outlet 113 for directing the water away from the system. In this embodiment a small paddle wheel or turbine wheel 118 is placed in the flow of water, which cause the wheel to rotate as water is pumped therepast. The axis of the wheel 118 connects to a dc generator that generates the dc voltage necessary for operation of the electrolytic cell. Thus a portion of the pumping energy of forcing the water through the system is used to drive the paddle wheel 118, which in turn drives the dc generator. The dc voltage is then used to operate the electrolytic cell. By using a d.c. generator one eliminates the need for heavy transformers to step down the 110 or 220 volts found in most systems. In addition, it allows the system 110 to be installed in either a 110 or a 220-volt system without any system modifications since the power for operation of the salt generator is converted from the mechanical energy of the system.

Thus, the system may include a method of attaching a mineral dispenser and electrolytic cell by placing a conduit for receiving a stream of water in a fluid line having a fluid pumped threrethrough; splicing a mineral dispenser and salt generator into a flow pipe in the system; removing a portion of a flow energy from a fluid pumped thereto by placing a generator in the flow pipe; and directing the current from the generator to an electrolytic cell to enable the mineral dispenser and the electrolytic cell to operate solely on the energy of the fluid flowing through the flow pipe.

A feature of system 200 is that it not only includes a number of sensors which can measure a water characteristic but sensors which can measure external factors in conjunction with sensor/controller 201. The function of measurement of external factors is not limited to system 200 but may be used with other embodiments of the systems described herein. The measurement of external factors may be used to anticipate an action needed to maintain or restore a condition or a characteristic of a body of water to a base state before actual changes to the water characteristic are detected or the measurement of the external factor may be used to increase the frequency of measurement of the water characteristics of the body of water. A benefit of the feature of measurement of external factors is that it allows the system to initiate corrective action before water conditions have deviated substantially from a base condition. This feature is particularly helpful when certain conditions or water characteristics are measured periodically or if there are limited amount of dispersants, which need to be periodically replaced based on operating and non-operating conditions of the system.

System 200 includes a solar sensor 240 for measuring an external factor such as the amount and or duration of sunlight proximate the pool 11 with the solar sensor 240 in communication with sensor/controller 201 through a lead 241. Typically, such measurements can be continually monitored while a measurement such as the pH of the pool may be measured periodically, for example hourly. In this example the measurements of the amount and or duration of sunlight proximate the pool can be compared with historical measurements of the amount and or duration of sunlight proximate the pool and the corresponding values of the pH of the pool associated therewith. Thus based on historical measurements of the amount and or duration of sunlight proximate the pool one can anticipate if the pH of the pool needs to be adjusted before an actual pH measurement of the water determines that the pH of the pool needs adjustment. Based on the comparison sensor/controller 201 can be programmed to initiate corrective action to initiate adjustment the pH before the pH sensor determines that the pH of the system has deviated from a base condition. Sensor/controller 201 may also include an information display 250, which provides visual or audible alerts or both about various water characteristics or conditions of the system and the corrective action being taken. Thus a measurement of an external factor may be used to either decrease the time between actual measurements of a water characteristic or if historical information on the effect of the external factor such as rain or sunlight on the water characteristic is known the system can initiate changes to the water characteristic before an actual measurement confirms the change in the water characteristic.

System 200 also includes a heater 242 for heating the water in pool 11 with the heater in communication with the sensor/controller 201 through lead 243. In addition to heater 242 a temperature sensor 245 measures the temperature of the water in pool 11 with the temperature sensor 245 in communication with the sensor/controller through lead 246. Sensor/controller 201 may include an information display 250, which provides visual or audible alerts or both about various parameters of the system. In this example the sensor/controller 201 can both measure an existing characteristics or condition of the pool such as the water temperature and begin immediate correction of the water temperature characteristics based on the current conditions of the water in the pool.

Another example of the anticipatory nature of the system 200 can be achieved by measuring an external factor such as the amount of rainfall proximate the pool and comparing the amount of rainfall to the historical relationship of rainfall to the pH of the water in the pool. By measuring the amount of rainfall and comparing it to the historical values of pH of the pool associated with the amount of rainfall one can initiate adjusting the pH of the system based on rainfall rather than waiting for an actual pH measurement of the water in the system. This feature is partially useful in those systems where the pH of the water is measured at selective intervals. In this example, based on the comparisons performed by sensor/controller 201 one can initiate corrective action of the pH of the system before the pH sensor actually measures that the pH of the system has deviated from the base condition.

Thus system 200 comprises a system which may be used for controlling water characteristics of a body of water at least partly through anticipation with the system including a sensor for periodic measurement of a water characteristic of the body of water; a further sensor for continual or periodic monitoring an external factor, which has an effect on the water characteristic; and a controller containing historical information on water characteristics as a function of external factors for comparison of a current measurement of an external factor to the historical information to thereby anticipate a change in the water characteristic and initiate a corrective action to the water characteristic before a periodic measurement of the water characteristics of the body of water determines that there has been a change in the water characteristic. For example, a pH dosing liquid may be dosed into the body of water prior to an actual pH measurement of the body of water. Thus by monitoring an external factor which has an effect on the water characteristic, at a frequency greater than the periodic measurement of the water characteristic one can initial a change in a water characteristic and a subsequent control of the pH of the body water can be based on an actual measurement of the pH of the pool A feature of the invention is that the invention may include the ability to anticipate when a dispersant, such as chlorine needs replenishing based on measurement of a time the chlorine is being delivered to the body of water and a dispenser feed rate and then comparing the time and the delivery rate to historical information on the total time to anticipate when the chlorine needs replacement or through calculations based on flow rates. More specifically, in one example the invention includes a method of anticipating a changing of a water affecting characteristics of a body of water by measuring a duration of time a dispenser having an initial batch of dispersant is in a dispensing condition and determining an accumulated dispensing time of the dispenser when the dispenser is in the dispensing condition. The system can then determine the amount of a dispersant remaining based on the time the dispenser has been in a dispensing condition and the initial batch of dispersant to thereby anticipate when the dispenser needs replenishing. This feature enables one to replenish the dispenser with a fresh dispersant prior to depletion of the dispersant in the dispenser based on the comparison of the accumulated dispensing time to historical information on the accumulated dispensing time or to expected depletion time based on current dispensing rates. To further estimate when to replenish one can measure both a rate of dispensing the dispersant and the dispersant time and then determine the amount of dispersant remaining based on both the time the dispenser has been in a dispensing condition and the rate of dispensing to thereby anticipate when the dispenser needs replenishing.

A feature of the invention is the ability to take initial corrective action based on external factors such as sunlight and rainfall, however, other factors may be used anticipate when corrective action needs to be taken. For example, monitoring the duration of time the pump 210 is in the on condition through line 251 and sensor controller 201. This information can be used to determine when a dispersant in dispenser 202 needs to be replenished since the dispenser 202 is in a dispensing condition when the pump 210 is in an on condition. Comparisons to historical information on pump on time in the controller sensor controller 201 or to computations of the dispensing rate and the batch of initial dispersant in the dispenser can be used to anticipate when the dispersant in dispenser 202 needs to be replenished. A signal can then be sent by sensor controller 201 to alerts indicator 250 to alert an operator that it is time to refill the dispenser.

I claim:

1. A system for water purification of a pool or spa comprising:
 a container having a body of water therein;
 an inline water circulation line for circulating water to and from the container;
 a pump for circulating the water to and from the container through the inline water circulation line;
 an optical sensor for periodically sampling water from the inline water circulation line and optically measuring a water characteristic of the sampled water wherein the measured water characteristic comprises a chlorine level, said sensor including a controller for determining if the sampled water is within a preselected range, said controller generating a dose signal if the chlorine level is below the preselected range and a no dose signal when the chlorine level is above the preselected range;
 a rain sensor located proximate the body of water for changing a frequency of periodic sampling of the water;
 an inline dispenser located in said water circulation line, said inline dispenser having a chamber therein;
 a batch of solid water purification materials including chlorine and minerals located in the chamber of the inline dispenser;
 a selector valve in said inline dispenser for manually controlling the flow of water through said chamber when water flows through said inline water circulation system to thereby maintain a fixed chlorine delivery rate to the body of water; and
 a diverter valve located upstream of the inline dispenser, said diverter valve responsive to the no dose signal to change the fixed chlorine delivery rate by reducing the water dosed through the inline dispenser to thereby maintain the chlorine level in the body of water within the preselected range.

2. The system of claim 1 wherein the sensor includes a pH sensor and a source of an active ingredient of either an acid or an alkaline for dosing into the water in response to a pH dose signal from the pH sensor.

3. The system of claim 1 wherein the rain sensor sends a signal to the controller to increase the frequency of periodic sampling of the water when said rain sensor detects rain.

4. The system of claim 1 wherein the dispenser is located in a parallel circulation line and the diverter valve shuts off the flow of water to the parallel circulation line in response to a no dose signal from said optical sensor and the diverter valve directs flow through the parallel circulation in response to a dose signal from said optical sensor.

5. A dosing system for controlling a level of a halogen in a body of water comprising:
 a dispenser;
 a batch of halogen in solid form located in the dispenser;
 an optical sensor for periodically measuring the level of the halogen in the body of water, said sensor including a controller for determining if the level of the halogen is within a predetermined range, said controller generating an output signal in response thereto if the level of the halogen is below the predetermined range;
 a diverter valve responsive to the output signal to dose water through the halogen in the dispenser to thereby elevate the level of halogen in the body of water; and
 a rain sensor for changing a frequency of periodically measuring the level of the halogen.

6. The system of claim 5 wherein the halogen comprises chlorine and the system includes a parallel water circulation line with the dispenser having a selector valve for controlling the flow of water into a dispensing chamber in the dispenser, said dispenser located in the parallel water circulation line and the diverter valve comprises a solenoid valve located upstream of the dispenser with the solenoid valve openable in response to the output signal to bring the dispenser from an offline non dosing condition to an online dosing condition with the selector valve adjustable for controlling a maximum delivery rate of halogen to the body of water.

7. The system of claim 5 wherein opening the diverter valve doses water from a water circulation line into the dispenser.

8. The system of claim 5 wherein the optical sensor periodically measures a plurality of water characteristics and generates a go or no go signal in response to the measured water characteristics and the rain sensor increases the frequency of periodically measuring the plurality of water characteristics.

9. The system of claim 5 wherein the diverter valve comprises a three-way valve that directs water though a water circulation line, a parallel water circulation or both the water circulation line and the parallel water circulation line in response to a signal from said optical sensor.

10. A two-step system for water purification of a body of water located in a pool comprising:
 a container having a body of water therein;
 an inline water circulation system for circulating water to and from the container;
 a pump for circulating the water to and from the container through the inline circulation system;
 a sensor for optically measuring a chlorine level of the body of water in the inline circulation system at a time interval;
 a controller to determine if the chlorine level is below a preselected range, said controller generating a dose signal when the chlorine level is below the preselected range and a no dose signal when the chlorine level is above the preselected range;
 a rain sensor for sending a signal to the controller to decrease the time interval between measuring the chlorine level when rain is detected;
 an inline dispenser located in said water circulation system, said inline dispenser having a chamber therein for flowing therethrough at least a portion of water from the inline circulation system;
 a batch of solid water purification materials including chlorine and minerals located in the chamber of the inline dispenser;

a selector valve in said inline dispenser for manually selecting a flow rate of water through said chamber to thereby maintain a fixed chlorine delivery rate from the inline dispenser; and a solenoid valve located upstream of said inline dispenser, said solenoid valve openable in response to the dose signal and closeable in response to the no dose signal whereby the dose signal doses water into the inline dispenser to cause the inline dispenser to deliver both chlorine and minerals into the inline circulation system at the fixed chlorine delivery rate and the no dose signal prevents dosing water into the inline dispenser to prevent delivery of both chlorine and minerals to the inline circulation system.

* * * * *